United States Patent
Wojcik et al.

(10) Patent No.: US 12,220,948 B1
(45) Date of Patent: Feb. 11, 2025

(54) PNEUMATIC TIRE BEAD AND SIDEWALL CONSTRUCTION

(71) Applicant: The Goodyear Tire & Rubber Company, Akron, OH (US)

(72) Inventors: Jacek Wojcik, Colmar-Berg (LU); Philippe Joseph Auguste Muller, Champlon (BE); Jaroslaw Antoni Kotwica, Rollingen (LU); Veronique Marie-Jose Herbeuval, Arlon (BE); Praveen Kumar Ranganath Gurav, Howald (LU); Martina Schiel, Babenhausen (DE); Bernd Zotz, Hanau (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 18/532,314

(22) Filed: Dec. 7, 2023

(51) Int. Cl.
*B60C 15/06* (2006.01)
*B60C 15/00* (2006.01)
*B60C 15/04* (2006.01)

(52) U.S. Cl.
CPC ...... *B60C 15/0607* (2013.01); *B60C 15/0009* (2013.01); *B60C 15/0036* (2013.01); *B60C 2015/048* (2013.01); *B60C 2015/0614* (2013.01); *B60C 2015/0617* (2013.01)

(58) Field of Classification Search
CPC . B60C 15/06; B60C 15/0603; B60C 15/0607; B60C 15/0242; B60C 2015/061
See application file for complete search history.

(56) References Cited

U.S. PATENT DOCUMENTS

| | | | |
|---|---|---|---|
| 6,053,229 A * | 4/2000 | Suzuki | B60C 15/0607 156/135 |
| 9,056,528 B2 | 6/2015 | Mori | |
| 9,533,460 B2 | 1/2017 | Ogawa | |
| 9,662,942 B2 | 5/2017 | Bourgeois | |
| 9,744,812 B2 | 8/2017 | Bourgeois | |

(Continued)

FOREIGN PATENT DOCUMENTS

| | | | |
|---|---|---|---|
| JP | 2010285105 A * | 12/2010 | |
| WO | 2009043377 A1 | 4/2009 | |

(Continued)

OTHER PUBLICATIONS

Machine translation: JP-2010285105-A, Kuniyasu Y, (Year: 2024).*

*Primary Examiner* — Kendra Ly
(74) *Attorney, Agent, or Firm* — June E. Rickey

(57) ABSTRACT

A pneumatic tire comprises a tread; a bead region, a sidewall; a bead core; a first apex; an apex-extension; a carcass; a chafer and a second apex. The second apex is positioned between a rim flange protector and the first apex or the extension. The carcass includes a first ply turned-up around the bead core to form a first turnup portion extending along the first apex and the extension and terminating radially inwardly from the radially outward end of the extension. The carcass may include a second ply turned-up, between the bead core and the first ply, around the bead core to form a second turnup portion, the second turnup portion extending along the axially outer side of the first apex. Alternatively, the carcass may include a second ply parting from the first ply at the extension and extending along the extension and the turnup portion of the first ply.

20 Claims, 3 Drawing Sheets

(56) References Cited

U.S. PATENT DOCUMENTS

| | | |
|---|---|---|
| 11,241,920 B2 | 2/2022 | Ogawa |
| 11,325,420 B2 | 5/2022 | Suzumori |
| 11,334,784 B2 | 5/2022 | Suita |
| 11,338,623 B2 | 5/2022 | Tobe |
| 11,577,554 B2 | 2/2023 | Barton |
| 11,850,893 B2 | 12/2023 | Rehab |
| 12,043,066 B2 | 7/2024 | Ferigo |
| 2006/0207709 A1* | 9/2006 | Tanaka ................ B60C 13/04 152/555 |
| 2013/0292027 A1 | 11/2013 | Sallaz et al. |
| 2013/0292028 A1 | 11/2013 | Sallaz et al. |
| 2013/0340913 A1 | 12/2013 | Sallaz et al. |
| 2014/0008003 A1 | 1/2014 | Sallaz et al. |
| 2015/0217605 A1* | 8/2015 | Munezawa ......... B60C 15/0054 152/541 |
| 2016/0082783 A1 | 3/2016 | Schn et al. |
| 2017/0305204 A1 | 10/2017 | De Riva-Perez |
| 2018/0111425 A1* | 4/2018 | Tomita ................. B60C 3/04 |
| 2018/0134100 A1* | 5/2018 | Kawaguchi ............ B60C 9/08 |
| 2018/0201067 A1 | 7/2018 | Guerbert-Jubert et al. |
| 2019/0322139 A1 | 10/2019 | Tokitoh |
| 2020/0016942 A1* | 1/2020 | Kameda ............ B60C 17/0009 |
| 2022/0324259 A1 | 10/2022 | Fournier et al. |
| 2022/0410638 A1 | 12/2022 | Barton |

FOREIGN PATENT DOCUMENTS

| | | |
|---|---|---|
| WO | 2020012121 A1 | 1/2020 |
| WO | 2020094952 A1 | 5/2020 |
| WO | 2020245241 A1 | 12/2020 |
| WO | 2020245242 A1 | 12/2020 |
| WO | 2023006162 A1 | 2/2023 |
| WO | 2023094537 A1 | 6/2023 |
| WO | 2023094540 A1 | 6/2023 |
| WO | 2023094541 A1 | 6/2023 |

* cited by examiner ized to the bead

PNEUMATIC TIRE BEAD AND SIDEWALL CONSTRUCTION

FIELD OF THE INVENTION

The present invention relates to a pneumatic tire and, more specifically, to a pneumatic bead and sidewall construction.

BACKGROUND OF THE INVENTION

U.S. Pat. No. 11,254,167 B2 discloses a pneumatic tire that includes a tread portion, two axially spaced sidewall portions extending radially inwardly from the tread portion, at least one of the sidewall portions being provided with a side protector that protrudes axially outwardly and having an inner end located radially outwardly of a tire-maximum-width position, and two axially spaced bead portions connected to radially inward of the respective sidewall portions. Each bead portion includes a bead apex rubber having an outer end in the tire radial direction being located radially inwardly of the tire-maximum-width position. A radial length of a tire inner region from a bead baseline to the outer end of each bead apex rubber is in a range of from 0.8 to 1.2 times a radial length of a tire outer region from a radially outermost position of the tread portion to the inner end of the side protector.

US 2020/114701 A1 relates to a tire including a tread, a sidewall extending from one edge of the tread approximately in a radially inward direction to a bead structure, and a carcass extending along an axially inner side of the sidewall to the bead structure. The carcass includes a first ply and a second ply extending radially inward from the sidewall to a terminal end directly adjacent the bead structure. The bead structure includes a circumferentially extending bead core axially inward of the sidewall, a chafer extending radially inward toward the bead core, an apex abutting the bead core, and an inner stiffener member disposed between the first ply and the apex, the inner stiffener member extending radially outward from a location proximate the bead core to a location radially outward from the apex.

US 2023/256779 A1 discloses a tire, wherein an apex of each bead includes an apex body, a strip apex, and an intermediate apex. The inner end of the strip apex is located between a ply body of a carcass ply and the apex body. The inner end of the intermediate apex is located between the strip apex and the apex body. The outer end of the apex body is located between the inner and outer ends of the intermediate apex. The intermediate apex is located between the inner and outer ends of the strip apex. The intermediate apex is harder than the apex body, and the strip apex is harder than the intermediate apex.

JP 2023050713 A relates to a tire that includes a pair of beads, a carcass, and a pair of strip apexes. The inner end of each of the strip apexes is located between a ply body and an apex. The outer end of each of the strip apexes is located in the radially outside of an end of a folding part of a first ply. The inner end of each of the strip apexes is located in the radially outside of an end of a folding part of a second ply.

JP 2015174515 A discloses a pneumatic tire, comprising: a tread; a pair of side walls; a pair of beads; a carcass; and a pair of strip apexes. The beads respectively comprise a core and an apex. The strip apexes are laminated in a radial direction outside of the apex. The strip apexes respectively comprise: a tip end lamination part laminated on a tip end of the apex and extending outward in the radial direction from the tip end; and an inside lamination part laminated on the apex in the radial direction inside of the tip end lamination part. The rigidity of the tip end lamination part is larger than that of the inside lamination part.

U.S. Pat. No. 6,318,431 B1 relates to a heavy-duty radial tire. The tire has a carcass including a carcass ply made of cords arranged at an inclination angle of 70 to 90 degrees with respect to the tire equator, the carcass ply including a main portion extending from a tread portion to a bead core in a bead portion and integrally provided with a turnup portion turned up from the axially inside to the outside at the bead core, a bead apex disposed between the main portion and turnup portion of the carcass ply, wherein the turnup portion extends radially outwardly along the axially outer surface of the bead apex and has a portion extending substantially parallel with and adjacent to the carcass ply main portion from the radially outer end of the bead apex, and the length L of the parallel portion is 1.0 to 8.0 times the maximum section width of the bead core.

U.S. Pat. No. 5,479,977 A discloses a pneumatic tire having a carcass structure increasing the sidewall rigidity. The tire comprises a carcass composed of an inner carcass ply and an outer carcass ply, the inner carcass ply having a pair of edges turned up around the bead cores from the axially inside to outside of the tire, each turned up portion thereof extending radially outwardly beyond the maximum tire width point, a bead apex disposed between the main portion and the turned up portion, the outer carcass ply having a pair of edges each disposed between the bead apex and each turned up portion of the inner carcass ply, the edges of the outer carcass ply terminated radially outward of the radially inner end of the bead core, each sidewall portion provided with at least one steel cord reinforcing layer made of parallel steel cords.

Chinese utility model CN 210652552 U relates to a semi-steel radial tire with an apex-extending rubber sheet. The tire includes a sidewall. A rim is set against the bottom of the sidewall. A first carcass ply is bent away from the inner wall of the sidewall at a position close to the rim to form a first turned-up portion. A second carcass ply is bent away from the inner wall of the sidewall at a position closer to the bead core. The turned-up portion is bonded to the apex, which gradually decreases in cross-section from the side close to the rim toward the top of the sidewall. An apex-extending rubber sheet is provided on the top end of the apex facing away from the rim.

SUMMARY OF THE INVENTION

In a first aspect, the invention relates to a pneumatic tire, e.g., a radial light-truck
(LT) tire, comprising:
  a tread;
  a bead region,
  a sidewall extending from an edge of the tread generally in a radially inward direction to the bead region;
  a circumferentially extending bead core arranged in the bead region;
  a first apex extending from the bead core in radially outward direction;
  an apex extension extending in radially outward direction from the first apex, the apex extension having a radially inward end and a radially outward end;
  a carcass extending along an axially inner side of the sidewall to the bead region, the carcass including:
    a first ply turned up around the bead core from an axially inner side to an axially outer side of the bead core so as to form a first turnup portion, the first turnup portion extending along an axially outer side of the first apex and along an axially outer side of the apex extension and terminating radially inwardly from the radially outward end of the apex extension, and a second ply turned up, between the bead core and the first ply, around the bead core from an axially inner side to an axially outer side of the bead core so as to form a second turnup portion, the second turnup portion extending along the axially outer side of the first apex;

a chafer positioned around at least a portion of the bead core and the first and second turnup portions, the chafer intended for contacting a rim of a wheel, the chafer comprising a toe guard and a rim flange protector; and a second apex positioned between the rim flange protector and at least one of the first apex and the apex extension.

The bead core may comprise, e.g., a hexagonal bead bundle or a square bead bundle. The bead core could have a diameter of 6 to 12 mm, but other diameter values may also be selected.

The first apex may taper in radially outward direction. The apex extension may be arranged in abutment on a radially outward extremity of the first apex. The apex extension may extend in a continuation of the first apex in radially outward direction. The apex extension may also be arranged overlapping with a radially outward extremity of the first apex. The radial extent of the overlap region preferably amounts to at most 30% of the radial extent of the first apex.

The apex extension may be of substantially uniform thickness over its radial extent.

According to an embodiment, the second turnup portion may extend along the axially outer side of the apex extension and terminate radially inwardly from the radially outward end of the apex extension.

According to an embodiment, the second turnup portion may terminate radially inwardly from the termination of the first turnup portion.

The second apex may comprise a radially inward region tapering in radially inward direction, a radially outward region tapering in radially outward direction and a bulged transition region between the radially outward region and the radially inward region. The second apex may have a preferred thickness from 3 to 7 mm in the bulged transition region.

The bead region may include a bead base, a rim flange contacting area, and a bead heel between the bead base and the flange contacting area. A reference point for indication of radial positions in the bead region (and in the sidewall region) may be defined as being located on the bead heel, in a position that is closest to an intersection of a straight-line continuation of the bead base and a straight-line continuation of the flange contacting area. According to an embodiment, the radially outward termination of the first turnup portion may be located at a distance from 40 to 110 mm from the reference point. The radially outward termination of the second turnup portion may be located at a distance from 25 to 80 mm from the reference point. The radially outward end of the apex extension may be located at a distance from 35 to 120 mm from the reference point.

The second apex may have a radially inward end located at a distance from 5 to 25 mm from the reference point and a radially outward end located at a distance from 35 to 70 mm from the reference point.

In a second aspect, the invention relates to a pneumatic tire, e.g., a radial LT tire, comprising:

a tread;
a bead region,
a sidewall extending from an edge of the tread generally in a radially inward direction to the bead region;
a circumferentially extending bead core arranged in the bead region;
a first apex extending from the bead core in radially outward direction;
an apex extension extending in radially outward direction from the first apex, the apex extension having a radially inward end and a radially outward end;
a carcass extending along an axially inner side of the sidewall to the bead region, the carcass including:
a first ply turned up around the bead core from an axially inner side to an axially outer side of the bead core so as to form a turnup portion, the turnup portion extending along an axially outer side of the first apex and along an axially outer side of the apex extension and terminating radially inwardly from the radially outward end of the apex extension; and
a second ply arranged alongside the first ply but parting from the first ply at the radially outward end of the apex extension and extending into the bead region along the axially outer side of the apex extension and along an axially outer side of the turnup portion of the first ply;
a chafer positioned around at least a portion of the bead core and the turnup portion of the first ply, the chafer intended for contacting a rim of a wheel, the chafer comprising a toe guard and a rim flange protector; and
a second apex positioned between the rim flange protector and at least one of the first apex and the apex extension.

The bead core may comprise, e.g., a hexagonal bead bundle or a square bead bundle. The bead core could have a diameter of 6 to 12 mm, but other diameter values may also be selected.

The first apex may have a taper in radially outward direction. The apex extension may be arranged in abutment on a radially outward extremity of the first apex. The apex extension may extend in a continuation of the first apex in radially outward direction. The apex extension may also be arranged overlapping with a radially outward extremity of the first apex. The radial extent of the overlap region preferably amounts to at most 30% of the radial extent of the first apex.

The apex extension may be of substantially uniform thickness over its radial extent.

According to an embodiment, the second ply may terminate radially inwardly from a radially outward end of the second apex.

The second apex may comprise a radially inward region tapering in radially inward direction, a radially outward region tapering in radially outward direction and a bulged transition region between the radially outward region and the radially inward region. The second apex may have a preferred thickness from 3 to 7 mm in the bulged transition region.

The bead region may include a bead base, a flange contacting area, and a bead heel between the bead base and the flange contacting area.

A reference point for indication of radial positions in the bead region (and in the sidewall region) may be defined as being located on the bead heel, in a position that is closest to an intersection of a straight-line continuation of the bead base and a straight-line continuation of the flange contacting area. According to embodiments, the radially outward termination of the first turnup portion may be located at a distance from 30 to 110 mm from the reference point. The radially inward termination of the second ply may be located at a distance from 0 to 15 mm from the reference point. The radially outward end of the apex extension may be located at a distance from 35 to 120 mm from the reference point.

The second apex may have a radially inward end located at a distance from 5 to 25 mm from the reference point and a radially outward end located at a distance from 35 to 70 mm from the reference point.

DEFINITIONS

The following definitions are applicable to the present disclosure:

"Apex" means a rubber filler in the bead and lower sidewall area to provide progressive transition from the stiff bead area into the flexible sidewall. The "first apex" herein means an apex located radially outwardly of the bead core and between at least one carcass ply and at least one turnup portion.

"Axial" and "axially" are used herein to refer to lines or directions that are parallel to the axis of rotation of the tire.

"Bead base" means a portion of the bead region that forms its inside (radially inner) diameter.

"Bead core" means an annular tensile member in the bead region of the tire, which may, e.g., be formed of a bundle of steel wire, cords, or cables ("bead bundle"). The bead core seats the tire on the rim and maintains it in position.

"Bead heel" means the curved area of the bead region that is tangent the bead base and the rim flange contacting area of the bead region.

"Bead Region" means the part of the tire that comprises an annular tensile member wrapped by ply cords and shaped, with or without other reinforcement elements such as flippers, chippers, apexes, toe guards and chafers, to fit the design rim.

"Bead toe" or "toe guard" means the portion of the bead region the joins the bead base and the axially inside surface of the tire.

"Belt package" (also: "breaker package") means a structure of at least two rubber-coated steel cord layers, woven or unwoven, between the tread and the carcass. The belt package provides strength to the tire, stabilizes the tread, and prevents cuts or perforations in the tread from reaching the carcass ply or plies.

"Carcass ply" or simply "ply" designates a continuous layer of rubber-coated reinforcing cords extending from one bead region to the other by describing an open toroidal form. A carcass ply may comprise turnup portions wrapped around the bead cores.

"Chafer" means an element of rubber, e.g., hard rubber, with or without fabric reinforcement, that resists erosion (chafing) of the bead region by the rim.

"Circumferential" means lines or directions extending along the perimeter of the surface of the annular tire parallel to the Equatorial Plane (EP) and perpendicular to the axial direction.

"Equatorial plane" means the plane perpendicular to the tire's axis of rotation and passing through the center of its tread.

"Meridian plane" means a plane that contains the tire's axis of rotation.

"Radial" and "radially" are used to mean directions radially toward or away from the axis of rotation of the tire.

A "radial tire" means a belted or circumferentially restricted pneumatic tire in which at least one ply has cords which extend from bead core to bead core and are laid at cord angles between 65° and 90° with respect to the equatorial plane of the tire.

"Rim" means a support for a tire or a tire and tube assembly upon which the tire bead regions are seated. A rim typically comprises rim flanges on its axial extremities.

"Rim Flange Protector" means an annular projection in the rim flange contacting area of the bead region that extends the chafer to follow the axially outward curvature of the rim flange, and generally protrudes at least as far out in axial direction as the flange.

"Rubber" or "elastomer" are used as synonyms and include both natural rubber compound and synthetic rubber compound. Unless otherwise specified, "rubber" designates a cured rubber (typically obtained from unsaturated rubber by sulfur or non-sulfur vulcanization). The rubber need not be completely cured, i.e., its molecular chains may contain residual cure sites (e.g., allylic positions) available for crosslinking with other molecular chains. The expressions "rubber composition" "compounded rubber" and "rubber compound" may be used interchangeably to refer to rubber (elastomer) which has been blended or mixed with various ingredients and materials, e.g., reinforcing fillers, such as carbon black, precipitated amorphous silica, or the like, and then cured. Specific examples of rubbers include neoprene (polychloroprene), polybutadiene (e.g., cis-1,4-polybutadiene), polyisoprene (e.g., cis-1,4-polyisoprene), butyl rubber, halobutyl rubber (such as, e.g., chlorobutyl rubber or bromobutyl rubber), styrene/isoprene/butadiene rubber, copolymers of 1,3-butadiene or isoprene with monomers such as, e.g., styrene, acrylonitrile and methyl methacrylate. Other types of rubber include carboxylated rubber, silicon-coupled rubber, or tin-coupled star-branched polymers.

"Sidewall" designates the axially outer parts of a tire that provide protection for the carcass ply or plies and withstand flexing and weathering.

In the present document, the verb "to comprise" and the expression "to be comprised of" are used as open transitional phrases meaning "to include" or "to consist at least of", not excluding the presence of further elements or components. Unless otherwise implied by context, the use of singular word form is intended to encompass the plural, except when the cardinal number "one" is used: "one" herein means "exactly one". Ordinal numbers ("first", "second", etc.) are used herein to differentiate between different instances of a generic object; no particular order, importance or hierarchy is intended to be implied by the use of these expressions. Furthermore, when plural instances of an object are referred to by ordinal numbers, this does not necessarily mean that no other instances of that object are present (unless this follows clearly from context). When reference is made to "an embodiment", "one embodiment", "embodiments", etc., this means that these embodiments may be combined with one another. Furthermore, the features of those embodiments can be used in the combination explicitly presented but also that the features can be combined across embodiments without departing from the invention, unless it follows from context that features cannot be combined.

BRIEF DESCRIPTION OF THE DRAWINGS

The invention will be described by way of example and with reference to the accompanying drawings in which.

DETAILED DESCRIPTION OF THE INVENTION

Figure 1:
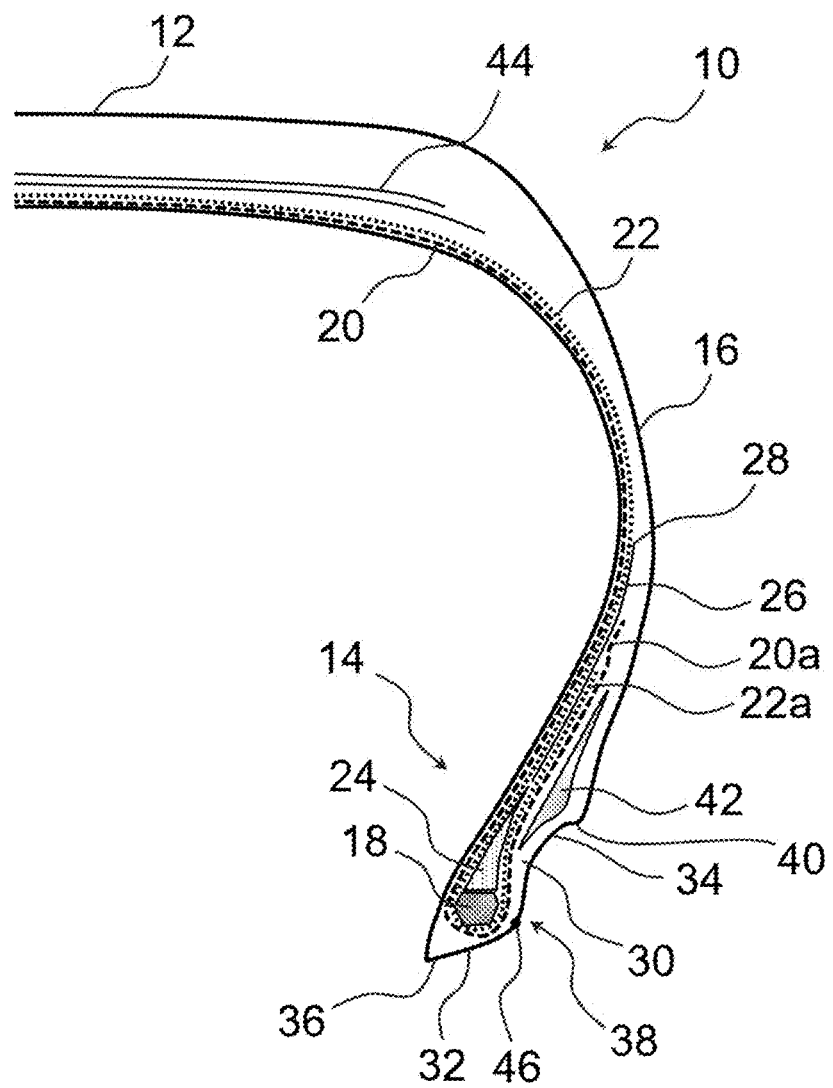
FIG. 1 is a partial cross-sectional view of a tire according to an embodiment of the first aspect of the invention, cut along a meridian plane thereof.

A first embodiment of a pneumatic radial light truck tire 10 in accordance with an embodiment of the invention is illustrated in FIG. 1. Pneumatic tire 10 is of generally open toroidal shape, of which the drawing shows only one quadrant in cross-section. Pneumatic tire 10 includes a tread 12, a bead region 14 and a sidewall 16 extending from an edge (or shoulder) of the tread generally in a radially inward direction to the bead region 14. The bead region includes a hexagonal bead core 18, which serves to secure the tire 10 to a rim. The tire 10 further includes first and second carcass plies 20, 22, which extend between the axially separated bead cores and which confer the tire its generally open toroidal shape. The first and second carcass plies 20, 22 are wrapped around the bead core 18 and terminate in respective turnup portions 20a, 22a located in bead region 14.

A first apex 24 is arranged in the bead region 14, radially outwardly of the bead core 18 and between the main portions of the first and second carcass plies 20, 22 on the one hand and the respective turnup portions 20a, 22a on the other hand. The first apex 24 serves as a filler that provides progressive transition from the rather stiff bead region into the more flexible sidewall portion. The first apex 24 tapers in radially outward direction. An apex extension 26 is arranged in the continuation of the first apex 24 in radially outward direction. Apex extension 26 may have the form of an annular strip apex or annular gumstrip. The radially inward end of the apex extension 26 may be arranged in abutment with the radially outward extremity of the first apex 24 or with some annular overlap with the first apex 24. When the apex extension 26 and the first apex are arranged with an annular overlap, the radial extent of the overlap region is preferably kept relatively small compared to the radial extents of the apex extension 26 and the first apex 24, e.g., below 30% of the radial extent of the first apex 24.

The turnup portion of the first ply 20, hereinafter the "first turnup portion 20a", extends along the axially outer side of the first apex 24 and along a part of the axially outer side of the apex extension 26 so as to terminate radially inwardly from the radially outward end 28 of the apex extension 26. The turnup portion of the second ply 22, hereinafter the "second turnup portion 22a", extends along the axially outer side of the first apex 24 and along a part of the axially outer side of the apex extension 26. The second turnup portion 22a is located axially inward from the first turnup portion 20a and terminates radially inwardly both from the radially outward end 28 of the apex extension 26 and from the termination of the first turnup portion 20a. In the illustrated embodiment, both the first turnup portion 20a and the second turnup portion 22a thus are in direct contact with respective annular portions of the apex extension 26.

The bead region 14 further comprises a chafer 30 positioned around at least a portion of the bead core 18 and the first and second turnup portions 20a, 22a. The chafer 30 may be comprised of one or more rubber components forming together a bead base 32 and a rim flange contacting area 34. The bead base 32 forms the radially inner diameter of the bead region 14 and includes a toe guard 36 on its axially inner side. The bead base 32 and the rim flange contacting area 34 are joined via a region called the bead heel 38. The rim flange contacting area 34 is terminated on its radially outer side by a rim flange protector 40.

A second apex 42 is arranged between the chafer portion(s) forming the rim flange protector 40 and at least one of the first apex 24 and the apex extension 26. In the illustrated embodiment, the second apex is sandwiched between the chafer and the turnup portions 20a, 22a of the carcass plies. The second apex 42 comprises a radially inward region tapering in radially inward direction, a radially outward region tapering in radially outward direction and a bulged transition region between the radially outward region and the radially inward region. The radially inward region of the second apex 42 generally follows the contour of the rim flange contacting area 34 while the bulged transition region is arranged axially inward from the rim flange protector 40. The second apex 42 reinforces the transition region between the bead region 14 and the sidewall 16. Together with the apex extension 26 and the turnup portions 20a, 22a of the plies, the second apex forms a multilayer reinforcement structure that provides sufficient stiffness to the transition region between the bead region 14 and the sidewall 16 and efficiently directs forces exerted on the tire 10 by the rim flange radially outwards.

Tread 12 is formed in the radially outer part of tire 10. The zones in which the tread portion and the sidewalls meet are generally referred to as the shoulders or tread edges of the tire 10. The tread 12 may be formed of a tread band, including one or more tread layers and a tread base. The tread 12 and rests on a belt package 44, which provides stability to the tread 12 and prevents cuts or perforations in the tread band from reaching the carcass plies 20, 22.

Figure 2:
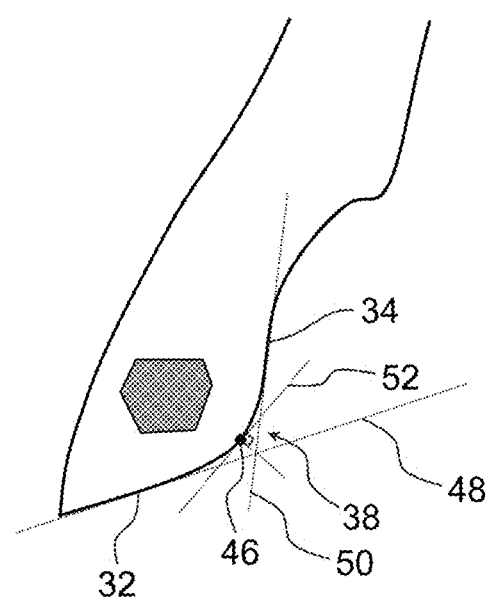
FIG. 2 is a schematic close-up view of the bead region illustrating the construction of a reference point for indications of position.

FIG. 2 illustrates the construction of a reference point 46 for position coordinates in the bead region (and in the sidewall region). In each meridian cross-sectional plane of the tire, a reference point 46 may be defined as being located on the bead heel 38, in a position that is closest to an intersection point of a straight-line continuation 48 of the bead base 32 and a straight-line continuation 50 of the flange contacting area 34. Line 52 corresponds to the tangent of the bead heel in reference point 46. By construction, reference point 46 corresponds to the orthogonal projection of the intersection point onto tangent 52.

Table 1 below indicates preferred distances from the reference point 46 of selected elements of tire 10:

TABLE 1

| Tire element | Distance from reference point |
| --- | --- |
| Ending of 1st turnup portion | 40 to 110 mm |
| Ending of 2nd turnup portion | 25 to 80 mm |
| Radially outward end of 1st apex | 10 to 40 mm |
| Radially inward end of apex extension | 5 to 40 mm |
| Radially outward end of apex extension | 35 to 120 mm |
| Radially inward end of 2nd apex | 5 to 25 mm |
| Radially outward end of 2nd apex | 30 to 70 mm |

In addition, the bead core preferably has a diameter of 6 to 12 mm, the first apex preferably has a base width in the range from 4 to 10 mm, and the second apex preferably has a thickness from 3 to 7 mm in the bulged transition region.

Table 2 indicates preferred gauges from the turnup portion of the first ply to the outer surface of the tire, at different distances from the reference point:

TABLE 2

| Distance from reference point | Gauge from 1st turnup portion to outer tire surface |
| --- | --- |
| 10 mm | 2 to 6 mm |
| 15 mm | 4 to 10 mm |
| 20 mm | 6 to 20 mm |
| 25 mm | 6 to 19 mm |
| 30 mm | 4 to 15 mm |
| 35 mm | 3 to 15 mm |
| 40 mm | 2.5 to 10 mm |
| 50 mm | 2.5 to 5 mm |

Figure 3:
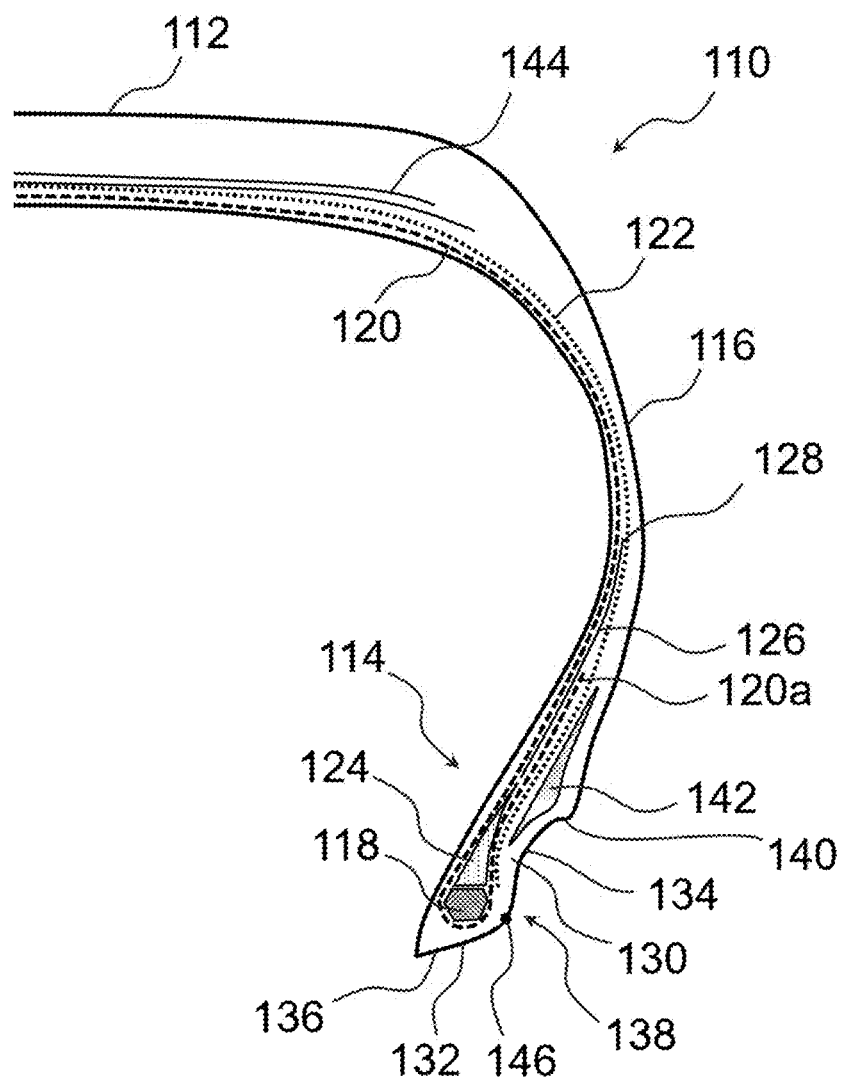
FIG. 3 is a partial cross-sectional view of a tire according to an embodiment of the second aspect of the invention, cut along a meridian plane thereof.

A second embodiment of a pneumatic radial light truck tire 110 in accordance with an embodiment of the invention is illustrated in FIG. 3. Pneumatic tire 110 includes a tread 112, a bead region 114 and a sidewall 116 extending from an edge (or shoulder) of the tread generally in a radially inward direction to the bead region 114. The bead region includes a hexagonal bead core 118, which serves to secure the tire 110 to a rim. The tire 110 further includes first and second carcass plies 120, 122, which extend between the axially separated bead cores and which confer the tire its generally open toroidal shape. The first carcass ply 120 is wrapped around the bead core 118 and terminates in a turnup portion 120a located in bead region 114.

A first apex 124 is arranged in the bead region 114, radially outwardly of the bead core 118 and between the main portion of the first carcass ply 120 on the one hand and the turnup portions 120a on the other hand. The first apex 124 serves as a filler that provides progressive transition from the rather stiff bead region 114 into the more flexible sidewall portion. The first apex 124 tapers in radially outward direction. An apex extension 126 is arranged in the continuation of the first apex 124 in radially outward direction. Apex extension 126 may have the form of an annular strip apex or annular gumstrip. The radially inward end of the apex extension 126 may be arranged in abutment with the radially outward extremity of the first apex 124 or with some annular overlap with the first apex 124. When the apex extension 126 and the first apex are arranged with an annular overlap, the radial extent of the overlap region is preferably kept relatively small compared to the radial extents of the apex extension 126 and the first apex 124, e.g., below 30% of the radial extent of the first apex 124.

The turnup portion 120a of the first ply 120, extends along the axially outer side of the first apex 24 and along a part of the axially outer side of the apex extension 126 so as to terminate radially inwardly from the radially outward end 128 of the apex extension 126.

The second carcass ply 122 is arranged alongside the first ply 120 in the radially outer part of the sidewall portion but it parts from the first ply 120 at the radially outward end 128 of the apex extension 126. From that point, the second carcass ply continues into the bead region 114 along the axially outer side of the apex extension 124. More radially inward, the second carcass ply 122 meets the turnup portion 120a of the first ply and then extends along the axially outer side of the turnup portion 120a of the first ply, forming an overlap with it.

The bead region 114 further comprises a chafer 130 positioned around at least a portion of the bead core 118 and the turnup portions 120a. The chafer 130 may be comprised of one or more rubber components forming together a bead base 132 and a rim flange contacting area 134. The bead base 132 forms the radially inner diameter of the bead region 114 and includes a toe guard 136 on its axially inner side. The bead base 132 and the rim flange contacting area 134 are joined via the bead heel 138. The rim flange contacting area 134 is terminated on its radially outer side by a rim flange protector 140.

A second apex 142 is arranged between the chafer portion(s) forming the rim flange protector 140 and at least one of the first apex 124 and the apex extension 126. In the illustrated embodiment, the second apex 142 is sandwiched on one side by the chafer 130 and on the other side by the turnup portion 120a and the second ply 122. The second apex 142 comprises a radially inward region tapering in radially inward direction, a radially outward region tapering in radially outward direction and a bulged transition region between the radially outward region and the radially inward region. The radially inward region of the second apex 142 generally follows the contour of the rim flange contacting area 134 while the bulged transition region is arranged axially inward from the rim flange protector 140. The second apex 142 reinforces the transition region between the bead region 114 and the sidewall 116. Together with the apex extension 126, the turnup portion 120a and the second ply 122, the second apex 142 forms a multilayer reinforcement structure that provides sufficient stiffness to the transition region between the bead region 114 and the sidewall 116 and efficiently directs forces exerted on the tire 110 by the rim flange radially outwards.

Tread 112 is formed in the radially outer part of tire 110. The zones in which the tread portion and the sidewalls meet are generally referred to as the shoulders or tread edges of the tire 110. The tread 112 may be formed of a tread band, including one or more tread layers and a tread base. The tread 112 and rests on a belt package 144, which provides stability to the tread 112 and prevents cuts or perforations in the tread band from reaching the carcass plies 120, 122.

A reference point 146 for position coordinates in the bead region (and in the sidewall region) is constructed in the same way as illustrated in FIG. 2.

Table 3 below indicates preferred distances from the reference point 146 of selected elements of tire 110:

TABLE 3

| Tire element | Distance from reference point |
| --- | --- |
| Ending of the turnup portion of 1st ply | 25 to 110 mm |
| Ending of 2nd ply | 0 to 20 mm |
| Radially outward end of 1st apex | 10 to 40 mm |
| Radially inward end of apex extension | 5 to 40 mm |
| Radially outward end of apex extension | 35 to 120 mm |
| Radially inward end of 2nd apex | 5 to 25 mm |
| Radially outward end of 2nd apex | 30 to 70 mm |

In addition, the bead core preferably has a diameter of 6 to 12 mm, the first apex preferably has a base width in the range from 4 to 10 mm, and the second apex preferably has a thickness from 3 to 7 mm in the bulged transition region.

Table 4 indicates preferred gauges from the second ply to the outer surface of the tire, at different distances from the reference point:

TABLE 4

| Distance from reference point | Gauge from 2nd ply to outer tire surface |
| --- | --- |
| 10 mm | 2 to 6 mm |
| 15 mm | 4 to 10 mm |
| 20 mm | 6 to 20 mm |
| 25 mm | 6 to 19 mm |
| 30 mm | 4 to 15 mm |
| 35 mm | 3 to 15 mm |
| 40 mm | 2.5 to 10 mm |
| 50 mm | 2.5 to 5 mm |

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire, comprising
   a tread;
   a bead region,
   a sidewall extending from an edge of the tread generally in a radially inward direction to the bead region;
   a circumferentially extending bead core arranged in the bead region;
   a first apex extending from the bead core in radially outward direction;
   an apex extension extending in radially outward direction from the first apex, the apex extension having a radially inward end and a radially outward end;
   a carcass extending along an axially inner side of the sidewall to the bead region, the carcass including:
      a first ply turned up around the bead core from an axially inner side to an axially outer side of the bead core so as to form a first turnup portion, the first turnup portion extending along an axially outer side of the first apex and along an axially outer side of the apex extension and terminating radially inwardly from the radially outward end of the apex extension; and
      a second ply turned up, between the bead core and the first ply, around the bead core from an axially inner side to an axially outer side of the bead core so as to form a second turnup portion, the second turnup portion extending along the axially outer side of the first apex;
   a chafer positioned around at least a portion of the bead core and the first and second turnup portions, the chafer intended for contacting a rim of a wheel, the chafer comprising a toe guard and a rim flange protector; and
   a second apex positioned between the rim flange protector and at least one of the first apex and the apex extension.

2. The pneumatic tire as claimed in claim 1, wherein the bead core comprises a hexagonal bead bundle.

3. The pneumatic tire as claimed in claim 1, wherein the first apex has a taper in radially outward direction, wherein the apex extension abuts on a radially outward extremity of the first apex and wherein the apex extension extends in a continuation of the first apex in radially outward direction.

4. The pneumatic tire as claimed in claim 1, wherein the apex extension is of substantially uniform thickness.

5. The pneumatic tire as claimed in claim 1, wherein the second turnup portion extends along the axially outer side of the apex extension and terminates radially inwardly from the radially outward end of the apex extension.

6. The pneumatic tire as claimed in claim 1, wherein the second turnup portion terminates radially inwardly from the termination of the first turnup portion.

7. The pneumatic tire as claimed in claim 1, wherein the second apex comprises a radially inward region tapering in radially inward direction, a radially outward region tapering in radially outward direction and a bulged transition region between the radially outward region and the radially inward region.

8. The pneumatic tire as claimed in claim 7, wherein the second apex has a thickness from 3 to 7 mm in the bulged transition region.

9. The pneumatic tire as claimed in claim 1, wherein the bead region includes a bead base, a flange contacting area, and a bead heel between the bead base and the flange contacting area,
   wherein the radially outward termination of the first turnup portion is located at a distance from 40 to 110 mm from a reference point, the reference point being located on the bead heel, in a position that is closest to an intersection of a straight continuation of the bead base and a straight continuation of the flange contacting area;
   wherein the radially outward termination of the second turnup portion is located at a distance from 25 to 80 mm from the reference point;
   wherein the radially outward end of the apex extension is located at a distance from 35 to 120 mm from the reference point.

10. The pneumatic tire as claimed in claim 9, wherein the second apex has a radially inward end located at a distance from 5 to 25 mm from the reference point and a radially outward end located at a distance from 35 to 70 mm from the reference point.

11. A pneumatic tire, comprising
   a tread;
   a bead region,
   a sidewall extending from an edge of the tread generally in a radially inward direction to the bead region;
   a circumferentially extending bead core arranged in the bead region;
   a first apex extending from the bead core in radially outward direction;
   an apex extension extending in radially outward direction from the first apex, the apex extension having a radially inward end and a radially outward end;
   a carcass extending along an axially inner side of the sidewall to the bead region, the carcass including:
      a first ply turned up around the bead core from an axially inner side to an axially outer side of the bead core so as to form a turnup portion, the turnup portion extending along an axially outer side of the first apex and along an axially outer side of the apex extension and terminating radially inwardly from the radially outward end of the apex extension; and
      a second ply parting from the first ply at the radially outward end of the apex extension and extending into the bead region along the axially outer side of the apex extension and along an axially outer side of the turnup portion of the first ply;

a chafer positioned around at least a portion of the bead core and the turnup portion of the first ply, the chafer intended for contacting a rim of a wheel, the chafer comprising a toe guard and a rim flange protector; and a second apex positioned between the rim flange protector and at least one of the first apex and the apex extension.

12. The pneumatic tire as claimed in claim 11, wherein the bead core comprises a hexagonal bead bundle.

13. The pneumatic tire as claimed in claim 11, wherein the first apex has a taper in radially outward direction, wherein the apex extension abuts on a radially outward extremity of the first apex and wherein the apex extension extends in a continuation of the first apex in radially outward direction.

14. The pneumatic tire as claimed in claim 11, wherein the apex extension is of substantially uniform thickness.

15. The pneumatic tire as claimed in claim 11, wherein the second ply terminates radially inwardly from a radially outward end of the second apex.

16. The pneumatic tire as claimed in claim 11, wherein the second apex comprises a radially inward region tapering in radially inward direction, a radially outward region tapering in radially outward direction and a bulged transition region between the radially outward region and the radially inward region.

17. The pneumatic tire as claimed in claim 16, wherein the second apex has a thickness from 3 to 7 mm in the bulged transition region.

18. The pneumatic tire as claimed in claim 11, wherein the bead region includes a bead base, a flange contacting area, and a bead heel between the bead base and the flange contacting area.

19. The pneumatic tire as claimed in claim 18, wherein the radially outward termination of the turnup portion of the first ply is located at a distance from 30 to 110 mm from a reference point, the reference point being located on the bead heel, in a position that is closest to an intersection of a straight continuation of the bead base and a straight continuation of the flange contacting area;

wherein the radially inward termination of the second ply is located at a distance from 0 to 15 mm from the reference point;

wherein the radially outward end of the apex extension is located at a distance from 35 to 120 mm from the reference point.

20. The pneumatic tire as claimed in claim 18, wherein the second apex has a radially inward end located at a distance from 5 to 25 mm from the reference point and a radially outward end located at a distance from 35 to 70 mm from the reference point.

* * * * *